United States Patent
Carpenter et al.

(10) Patent No.: US 12,026,758 B2
(45) Date of Patent: Jul. 2, 2024

(54) SYSTEMS AND METHODS FOR IDENTIFYING SIGNALS OF LOW-QUALITY LISTINGS

(71) Applicant: CARS.COM, LLC, Chicago, IL (US)

(72) Inventors: Alexis Carpenter, Chicago, IL (US); Sanjay Kumar Dasari, Chicago, IL (US); Addhyan Pandey, Chicago, IL (US); Joao Moreira, Chicago, IL (US); Audrey Salerno, Chicago, IL (US); Chirag S. Patel, Naperville, IL (US)

( * ) Notice: Subject to any disclaimer, the term of this patent is extended or adjusted under 35 U.S.C. 154(b) by 260 days.

(21) Appl. No.: 17/741,995

(22) Filed: May 11, 2022

(65) Prior Publication Data
US 2023/0368271 A1    Nov. 16, 2023

(51) Int. Cl.
*G06Q 30/0282*    (2023.01)
*G06Q 30/0201*    (2023.01)
*G06Q 30/06*    (2023.01)
*G06Q 30/0601*    (2023.01)
*G06N 20/00*    (2019.01)
*G06Q 10/00*    (2023.01)
*G06Q 10/087*    (2023.01)

(52) U.S. Cl.
CPC ..... *G06Q 30/0282* (2013.01); *G06Q 30/0206* (2013.01); *G06Q 30/0613* (2013.01); *G06N 20/00* (2019.01); *G06Q 10/087* (2013.01); *G06Q 30/0633* (2013.01)

(58) Field of Classification Search
None
See application file for complete search history.

(56) References Cited

U.S. PATENT DOCUMENTS

| | | | | |
|---|---|---|---|---|
| 8,838,610 | B2* | 9/2014 | Swartz | G06F 16/00 |
| | | | | 707/748 |
| 10,467,631 | B2* | 11/2019 | Dhurandhar | G06N 7/01 |
| 10,515,138 | B2* | 12/2019 | Walker | G06F 40/289 |
| 10,579,834 | B2* | 3/2020 | Walia | G06F 40/232 |
| 11,120,029 | B2* | 9/2021 | DiBenedetto | G06F 16/51 |
| 11,475,083 | B1* | 10/2022 | Yu | G06F 16/9535 |
| 11,630,952 | B2* | 4/2023 | MacAvaney | G06V 10/82 |
| | | | | 706/15 |

(Continued)

OTHER PUBLICATIONS

Johnson, D., "Is eBay safe? Yes, but its safety protections tend to favor buyers over sellers," Business Insider, US edition [New York] May 24, 2021. (Year: 2021).*

*Primary Examiner* — Nicholas D Rosen
(74) *Attorney, Agent, or Firm* — MARSHALL, GERSTEIN & BORUN LLP

(57) ABSTRACT

Systems, methods, and computer-readable medium storing instructions for identifying low-quality signals of an electronic listing of a listing entity are described herein. The method, system, or instructions may include ingesting text including listing information of the electronic listing and listing entity information of the listing entity; normalizing the text; parsing the text to identify a plurality of phrases; generating a set of category scores for each of at least one of the plurality of phrases; identifying, based on the on the sets of category scores, one or more low-quality signals each including a low-quality phrase and low-quality categories; and presenting an indication of the one or more low-quality signals with the electronic listing.

20 Claims, 9 Drawing Sheets

(56) References Cited

U.S. PATENT DOCUMENTS

| | | | |
|---|---|---|---|
| 11,756,049 B1* | 9/2023 | Shankar | G06Q 30/0206 |
| | | | 705/7.35 |
| 2011/0106851 A1* | 5/2011 | Swartz | G06Q 30/0603 |
| | | | 707/E17.108 |
| 2015/0324879 A1* | 11/2015 | Lu | G06Q 30/06 |
| | | | 705/26.35 |
| 2017/0046311 A1* | 2/2017 | Walker | G06F 40/103 |
| 2017/0116177 A1* | 4/2017 | Walia | H04M 7/0045 |
| 2017/0293917 A1* | 10/2017 | Dhurandhar | G06Q 30/04 |
| 2020/0311790 A1* | 10/2020 | Keren | G06Q 20/4016 |
| 2020/0334262 A1* | 10/2020 | DiBenedetto | G06F 16/5838 |
| 2021/0027141 A1* | 1/2021 | MacAvaney | G06F 17/15 |
| 2023/0214582 A1* | 7/2023 | Wang | G06F 40/171 |
| | | | 715/230 |

* cited by examiner

200B

202B — 5.0 ★★★★★
Excellent customer service

May 12, 2021
By David Guiterez from Aurora, CO

204B { I worked with Pete and Igor on buying one of the vehicles, however, we ended up buying a brand new one from another dealer. They were non pushy, very knowledgeable about their products. I would recommend them, and already have to family members and friends.

Show full review ∨

Gorgous used 2018 black Sapphire/Cognac Leather model. Engine w/ factory rated 333hp, 485LB/FT of Torque. Interior in ~immaculate~ condition!! Price doesn't include CA taxes, title, fees, and accessories. Subject to credit app. Displayed sale price available if financed through our dealership Visit us today and bring your student/military ID for additional discounts.

302A

304A

GORGEOUS USED 2018 BLACK SAPPHIRE AND COGNAC LEATHER MODEL. ENGINE WITH FACTORY RATED 333 HORSEPOWER, 485 POUNDS PER FOOT OF TORQUE. INTERIOR IN IMMACULATE CONDITION. PRICE DOES NOT INCLUDE CALIFORNIA TAXES, TITLE, FEES, AND ACCESSORIES. SUBJECT TO CREDIT APPROVAL. DISPLAYED SALE PRICE AVAILABLE IF FINANCED THROUGH OUR DEALERSHIP. VISIT US TODAY AND BRING YOUR STUDENT OR MILITARY IDENTIFICATION FOR ADDITIONAL DISCOUNTS.

306A

| Phrase | Fees | Taxes & Registration | Incentives | Financing | Cosmetic | Mechanical | Accident/ Salvage | Inventory |
|---|---|---|---|---|---|---|---|---|
| GORGEOUS USED 2018 BLACK SAPPHIRE AND COGNAC LEATHER MODEL | NO | NO | NO | NO | NO | NO | NO | NO |
| ENGINER WITH FACTORY RATED 333 HORSEPOWER, 485 POUNDS PER FOOT OF TOURQUE | NO | NO | NO | NO | NO | NO | NO | NO |
| INTERIOR IN IMMACULATE CONDITION | NO | NO | NO | NO | YES | NO | NO | NO |
| PRICE DOES NOT INCLUDE CALIFORNIA TAXES, TITLE, FEES, AND ACCESSORIES | YES | YES | NO | NO | NO | NO | NO | NO |
| SUBJECT TO CREDIT APPROVAL | NO | NO | NO | NO | NO | NO | NO | NO |
| DISPLAYED SALE PRICE AVAILABLE IF FINANCED THROUGH OUR DEALERSHIP | NO | NO | NO | YES | NO | NO | NO | NO |
| VISIT US TODAY AND BRING YOUR STUDENT OR MILITARY IDENTIFICATION FOR ADDITIONAL DISCOUNTS | NO | NO | NO | NO | NO | NO | NO | NO |

308A

GORGEOUS USED 2018 BLACK SAPPHIRE AND COGNAC LEATHER MODEL. ENGINE WITH FACTORY RATED 333 HORSEPOWER, 485 POUNDS PER FOOT OF TORQUE. INTERIOR IN IMMACULATE CONDITION. PRICE DOES NOT INCLUDE CALIFORNIA TAXES, TITLE, FEES, AND ACCESSORIES. SUBJECT TO CREDIT APPROVAL. DISPLAYED SALE PRICE AVAILABLE IF FINANCED THROUGH OUR DEALERSHIP. VISIT US TODAY AND BRING YOUR STUDENT OR MILITARY IDENTIFICATION FOR ADDITIONAL DISCOUNTS.

302B — After a 3 and a half hour drive to the dealership, I arrived and the salesman said the 2018 model I had called about was not actually in their possession. So instead he showed me a used 2017 model they just got in. The salesman said the 2017 model was in great shape, but I found stains in its interior and it had 42k more miles than the 2018 model. Dealer offered to give us big discont bc of the stains and miles. But then, after doing a background check on the 2017 model, we found it had been in an accident and was a salvage title. We didn't buy...zero stars!!

304B — AFTER A 3 AND A HALF HOUR DRIVE TO THE DEALERSHIP, I ARRIVED AND THE SALESMAN SAIDTHE 2018 MODEL I HAD CALLED ABOUT WAS NOT ACTUALLY IN THEIR POSSESSION. SO INSTEAD HE SHOWED ME A USED 2017 MODEL THEY JUST GOT IN. THE SALESMAN SAID THE 2017 MODEL WAS IN GREAT SHAPE, BUT I FOUND STAINS IN ITS INTERIOR AND IT HAD 42000 MORE MILES THAN THE 2018 MODEL. DEALER OFFERED TO GIVE US BIG DISCOUNT BECAUSE OF THE STAINS AND MILES. BUT THEN, AFTER DOING A BACKGROUND CHECK ON THE 2017 MODEL, WE FOUNDIT HAD BEEN IN AN ACCIDENT AND WAS A SALVAGE TITLE. WE DID NOT BUY. ZERO STARS.

306B

| Phrase | Fees | Taxes & Registration | Incentives | Financing | Cosmetic | Mechanical | Accident/ Salvage | Inventory |
|---|---|---|---|---|---|---|---|---|
| AFTER A 3 AND A HALF HOUR DRIVE TO THE DEALERSHIP, I ARRIVED AND THE SALESMAN SAID THE 2018 MODEL I HAD CALLED ABOUT WAS NOT ACTUALLY IN THEIR POSSESSION. | NO | NO | NO | NO | NO | NO | NO | YES |
| SO INSTEAD HE SHOWED ME A USED 2017 MODEL THEY JUST GOT IN | NO | NO | NO | NO | NO | NO | NO | YES |
| THE SALESMAN SAID THE 2017 MODEL WAS IN GREAT SHAPE, BUT I FOUND STAINS IN ITS INTERIOR AND IT HAD 42000 MORE MILES THAN THE 2018 MODEL | NO | NO | NO | NO | YES | YES | NO | NO |
| DEALER OFFERED TO GIVE US BIG DISCOUNT BECAUSE OF THE STAINS AND MILES | NO | NO | NO | NO | NO | NO | NO | NO |
| BUT THEN, AFTER DOING A BACKGROUND CHECK ON THE 2017 MODEL, WE FOUND IT HAD BEEN IN AN ACCIDENT AND WAS A SALVAGE TITLE | NO | NO | NO | NO | NO | NO | YES | NO |

308B — AFTER A 3 AND A HALF HOUR DRIVE TO THE DEALERSHIP, I ARRIVED AND THE SALESMAN SAID THE 2018 MODEL I HAD CALLED ABOUT WAS NOT ACTUALLY IN THEIR POSSESSION. SO INSTEAD HE SHOWED ME A USED 2017 MODEL THEY JUST GOT IN. THE SALESMAN SAID THE 2017 MODEL WAS IN GREAT SHAPE, BUT I FOUND STAINS IN ITS INTERIOR AND IT HAD 42000 MORE MILES THAN THE 2018 MODEL. DEALER OFFERED TO GIVE US BIG DISCOUNT BECAUSE OF THE STAINS AND MILES. BUT THEN, AFTER DOING A BACKGROUND CHECK ON THE 2017 MODEL, WE FOUND IT HAD BEEN IN AN ACCIDENT AND WAS A SALVAGE TITLE.

Fig. 3B

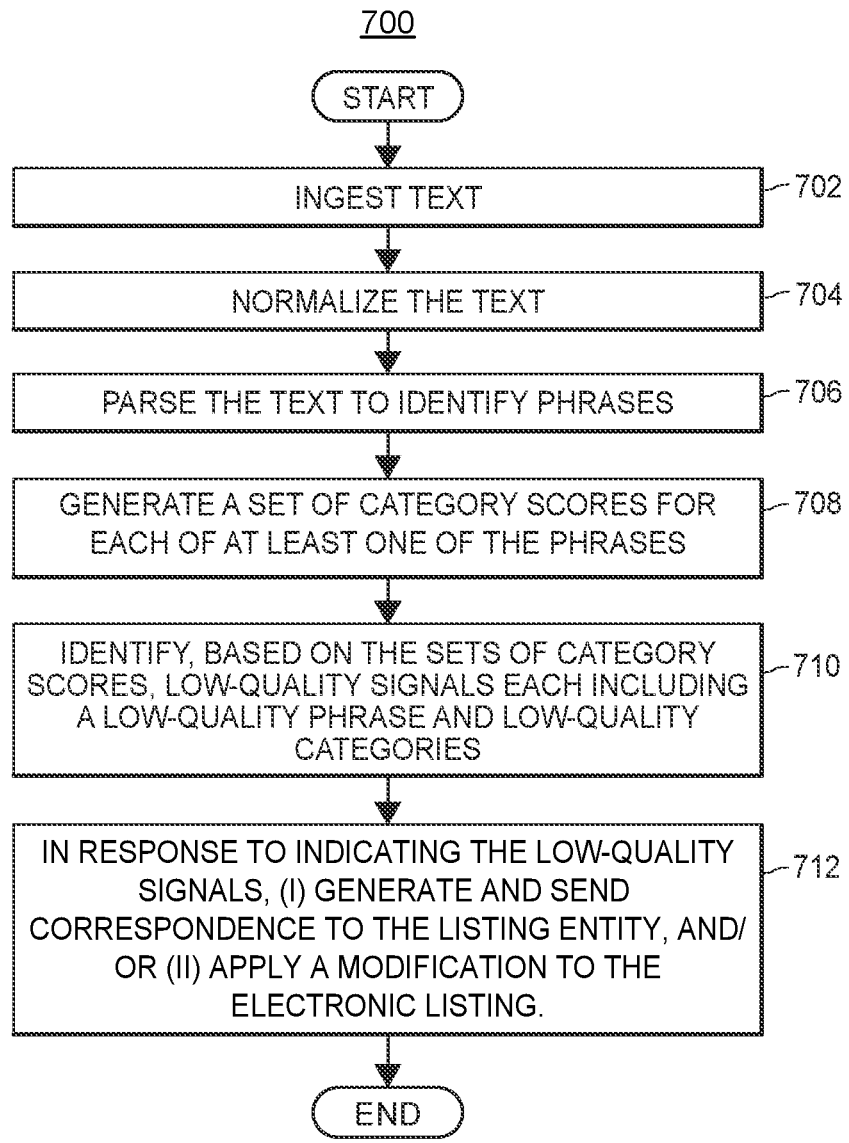

SYSTEMS AND METHODS FOR IDENTIFYING SIGNALS OF LOW-QUALITY LISTINGS

TECHNICAL FIELD

The present disclosure generally relates to identifying and presenting an indication of low-quality signals of an electronic listing to a user via a graphical user interface.

BACKGROUND

Electronic listings are often used when selling a good or service. Numerous electronic listings may be compiled by and hosted by a single host, such as by a website like an online marketplace. Online marketplaces may contain millions of goods/services listed for sale using electronic listings which often include information (e.g., text, pictures, videos, structured data tables, reviews, etc.) regarding key features of a particular good or service, regarding the listing entity which has listed the good or service for sale, or regarding contact preferences. Listing entity reviews provide consumers a space where they can discuss their experience with a particular listing entity or a particular good or service. Some experiences described in a listing entity review may be positive, some experiences may be negative, some experiences may include some negative aspects but be overall positive, and some experiences may include some positive aspects but be overall negative. Discussion of negative aspects of an experience included in a listing entity review often include discussion of deceptive selling practices by the listing entity.

Listing entity reviews are not the only place where evidence of deceptive selling practices by a listing entity may be present. Often times the evidence of deceptive selling practices may be present in an electronic listing itself. For example, electronic listings often include a structured data field where the listed price for the good or service may be displayed (often prominently in the electronic listing). The listed price typically reflects the cost to the consumer for the good or service less applicable taxes or shipping. While not including taxes or shipping may be so commonly done across some online marketplaces that it has become the expectation among consumers (and may not correspond to a deceptive selling practice), some listing entities may also not include additional costs or pricing caveats in the listed price so that the listing entity may make the good or service included in the electronic listing appear cheaper than an actual cost which will be paid by the consumer should they purchase the good or service. Some listing entities will note these additional costs or pricing caveats only in a description included in the electronic listing. It is worth noting, however, in some examples of online marketplaces, consumers have come to expect taxes or shipping to be included in the listing price, and not doing so may also correspond to a deceptive selling practice). In general, when listing entities in an online marketplace engage in deceptive selling practices, consumer trust in the online marketplace may be reduced.

Existing techniques of presenting electronic listings in an online marketplace rely largely on the consumer reviewing and understanding information included in the electronic listings and listing entity reviews to determine if an electronic listing includes low-quality signals (e.g., deceptive pricing terms). Existing techniques do not aid the consumer in identifying low-quality signals in electronic listings. This is a problem of significance for users of online marketplaces as it can be difficult for the users to identify low-quality signals in an electronic listing. For example, a particular user of a vehicle online marketplace may view hundreds of electronic listings for vehicles, and, therefore, may only be able to spend a short amount of time viewing each individual electronic listing. The particular user may not be able to identify low-quality signals included in each electronic listing he or she views given the short amount of time her or she may spend viewing each electronic listing. Additionally, the unstructured or semi-structured nature of the listing text prevents the use of existing computer-implemented techniques of simple pattern-matching to automatically identify deceptive or other low-quality signals in electronic listings. Accordingly, improved techniques are needed to generate and present deceptive signals to users in electronic listing systems.

SUMMARY

The present application discloses a method, system, and computer-readable medium storing instructions for identifying low-quality signals of an electronic listing of a listing entity (e.g., a product seller or vehicle dealer). The method, system, or instructions may include ingesting text including (i) listing information of the electronic listing and (ii) listing entity information of the listing entity; normalizing the text by replacing first text of the text with second text from a list of predetermined text; parsing the text to identify a plurality of phrases included in the text; generating a respective set of category scores for each of at least one of the plurality of phrases by applying a scoring algorithm, wherein the respective set of category scores includes a plurality of scores for each of a plurality of low-quality categories; identifying one or more low-quality signals which each include: (i) a respective low-quality phrase that is a phrase of the at least one of the plurality of phrases that corresponds to at least one score of the respective set of low-quality category scores that satisfies a low-quality threshold, and (ii) at least one of the plurality of low-quality categories that corresponds to the at least one score that satisfies the low-quality threshold; and presenting an indication of the one or more low-quality signals together with the electronic listing to a user via a graphical user interface.

Some embodiments may include generating an aggregated listing entity score of the listing entity based on the one or more low-quality signals. The aggregated listing entity score may be indicated, either a part of the presented indication or separately.

Further embodiments may include receiving feedback from a user following presenting the indication of the one or more low-quality signals. The feedback may be related to the low-quality signals and including user input. The feedback from the user may be analyzed to determine inferred value of the indication of the one or more low-quality signals, from which the scoring algorithm may be updated based on the feedback from the user.

Still further embodiments may include receiving a training data set comprising a plurality of electronic listings and generating the scoring algorithm by training a machine learning model using the training data set.

Yet further embodiments may include at least one of the following in response to identifying the one or more low-quality signals: (i) generating and sending correspondence regarding the one or more low-quality signals to the listing entity, or (ii) applying a modification to the electronic listing.

In various embodiments, additional, fewer, or alternate actions may be included or performed by the method, system, and computer-readable medium, including those discussed elsewhere herein.

BRIEF DESCRIPTION OF THE DRAWINGS

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 2B illustrates an exemplary listing entity review with listing entity information.

FIG. 3A illustrates an exemplary process for ingesting listing information and identifying low-quality signals.

FIG. 3B illustrates an exemplary process for ingesting listing entity information and identifying low-quality signals.

FIG. 7 illustrates a flow diagram of an exemplary method for identifying low-quality signals of an electronic listing of a listing entity and generating and sending correspondence to the listing entity or applying a modification to the electronic listing.

DETAILED DESCRIPTION

The invention described herein aims to reduce problems with conventional approaches of presenting electronic listings in an online marketplace by identifying and indicating low-quality signals (e.g., deceptive terms) in the electronic listings. Specifically, methods, systems, and computer-readable medium storing instructions for identifying low-quality signals of an electronic listing of a listing entity are disclosed. Identifying low-quality signals increases the information value of listings and enables users or a host of an online marketplace including the electronic listing to quickly identify deceptive selling practices. By informing users of low-quality signals, users may be able to more quickly make more informed and improved decision relative to conventional electronic listing displaying methods. Advantageously, the invention described herein enables automatic detection of low-quality signals in unstructured or semi-structured text in an electronic listing. This may reduce a length of time a user spends looking at electronic listings of goods and services via identifying low-quality signals, allowing the user to spend their time on other, possibly more important, endeavors. This may further help users avoid making less favorable purchasing decisions due to overlooking key information in listings by identifying low-quality signals. Also advantageously, the invention described herein may reduce a number of transmissions or bandwidth consumed in a user's buying experience as identifying low-quality signals enables the user to more readily identify a good or service that matches their needs/interests after viewing a fewer number of electronic listings, as compared to conventional methods. Additional advantages of the invention described herein over conventional approaches of presenting electronic listings in an online marketplace will be appreciated throughout this disclosure to one having ordinary skill in the art.

Figure 1:
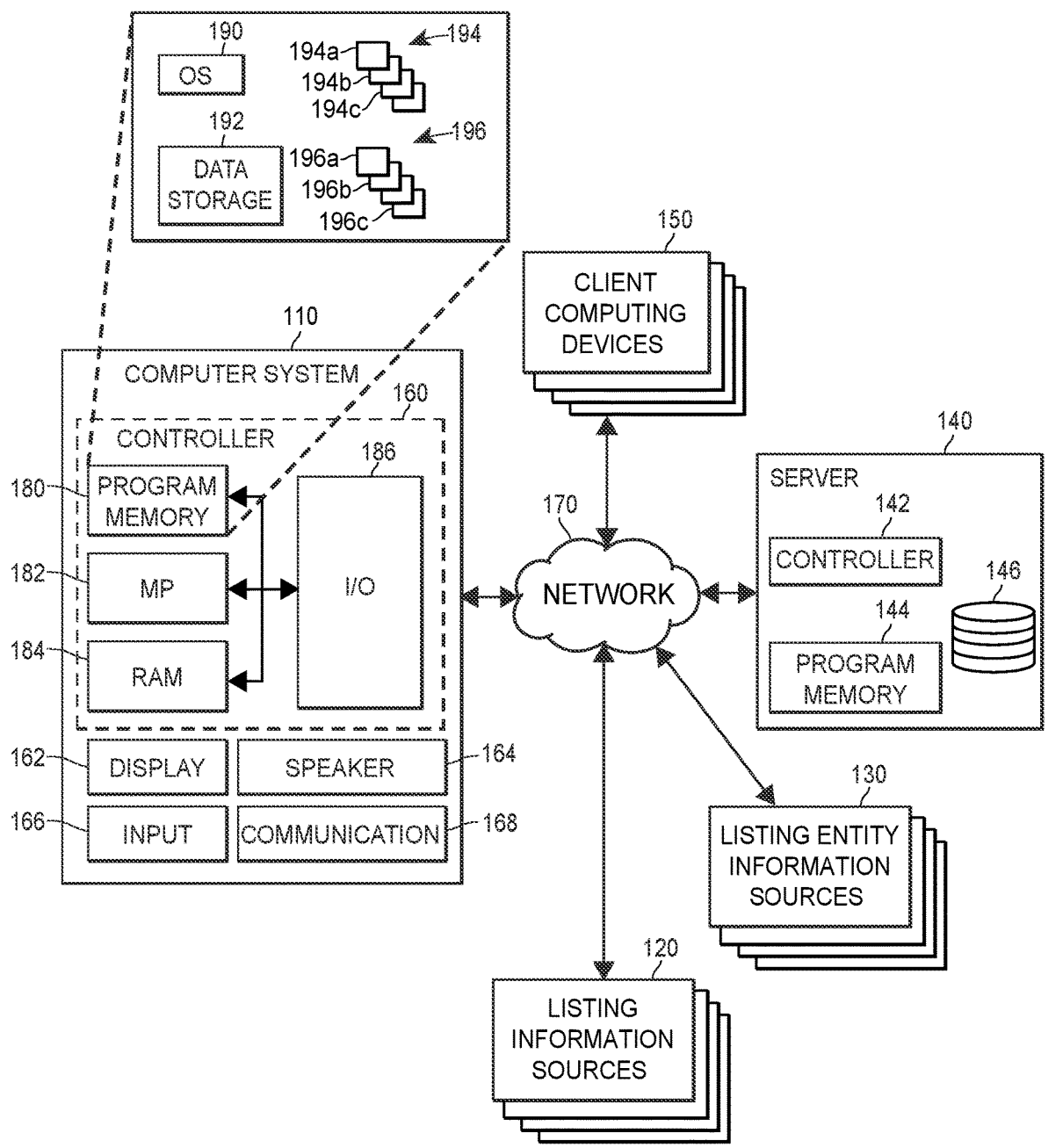
FIG. 1 illustrates a block diagram of an exemplary system on which the methods described herein may operate in accordance with the embodiments described herein.

FIG. 1 illustrates a block diagram of an exemplary computing environment 100 within which present techniques may be implemented in accordance with some aspects of the invention disclosed herein. The computing environment 100 may include a computer system 110, one or more listing information sources 120, and one or more listing entity information sources 130, a server 140, and one or more client computing devices 150, at least some of which may be communicatively coupled via a network 170 that may be a proprietary network, a secure public internet, a virtual private network, or some other type of network, such as dedicated access lines, plain ordinary telephone lines, satellite links, cellular data networks, combinations of these, etc. Where the network 170 comprises the Internet, data communications may take place over the network 170 via an Internet communication protocol. In some aspects, more or fewer instances of the various components of the computing environment 100 may be included (e.g., one instance of the computer system 110, ten instances of the listing entity information sources 130, one-thousand instances of the client computing devices 150, etc.) in the computing environment 100. In some aspects, some or all of the components of the computing environment 100 may be owned, operated, or maintained by (or on behalf of) an online marketplace hosting a plurality of electronic listings.

The computer system 110 may be a back-end component that may be any suitable computing device (e.g., a desktop computer, a notebook computer, a netbook computer, a smartphone, a tablet computer, a wearable electronic device, a network of computers or servers, or similar mobile or stationary computing device capable of receiving and processing electronic information). The computer system 110 may include one or more inputs to the computer system 110 (e.g., a keyboard). At least some of the functions of the computer system 110 may be performed by one or more servers (e.g., the server 140) communicatively coupled to the computer system 110 via the network 170. For example, the one or more servers may perform overlapping functions or distinct functions as the computer system 110. In one aspect, a first server may provide information or data in response to requests and store information or data associated with such requests, while a second server may perform analysis on the information or data provided by the first server. The computer system 110 may include a controller 160, a display 162, one or more speakers 164, one or more inputs 166, and a communication unit 168. The components of the computer system 110 may be interconnected via an address/data bus or other means. In some aspects, more or fewer instances of the various components of the computer system 110 may be included (e.g., one instance of the controller 160, two instances of the display 162, five instances of the speakers 164, etc.) in the computer system 110.

The controller 160 of the computer system 110 may be configured to receive, process, produce, transmit, or store data. When the controller 160 (or another processor) receives an indication of a user action or request, the controller 160 may determine appropriate responses and implement the appropriate responses. Such responses may include processing information or data for presentation to the user, requesting information or data from one or more of the data sources 120 or 130 or the server 140, determining information regarding the computer system 110, or causing information to be presented to be presented to a user. The controller 160 may include one or more program memories 180, one or more microcontrollers or microprocessors (MPs) 182, a random access memory (RAM) 184, and an I/O circuit 186. The components of the controller 160 may be interconnected via an address/data bus or other means. In some aspects, more or fewer instances of the various components of the controller 160 may be included (e.g., one instance of the I/O circuit 186, ten instances of the MPs 182, etc.) in the computer system 110.

The program memories 180 may include an operating system 190, a data storage 192, a plurality of software applications 194, and a plurality of software routines 196. In some aspects, more or fewer instances of the various components of the program memories 180 may be included (e.g., one instance of the operating system 190, ten instances of the software applications 194, etc.) in the program memories 180.

The MPs 182 may include one or more processors of any known or hereafter developed type, including general-purpose processors or special-purpose processors (e.g., one or more CPUs, one or more GPUs, one or more ASIC processors, etc.). Similarly, the controller 160 may include the RAM 184 and the program memories 180, respectively including one or more semiconductor memories, magnetically readable memories, optically readable memories, flash memories, non-transitory computer-readable media, etc.

The operating system 190, for example, may be one of a plurality of known operating systems such as Microsoft Windows®, macOS®, LINUX®, UNIX®, iOS®, Android™, Palm® webOS, Windows® Mobile/Phone, BlackBerry® OS, Chrome OS™, Symbian® OS, etc. The data storage 192 may include data such as application data for the plurality of applications 194, routine data for the plurality of routines 196, and other data necessary to interact with the network 170 or the data sources 120 or 130 or the server 140. In some aspects, the controller 160 may also include, or otherwise be communicatively connected to, other data storage mechanisms (e.g., one or more hard disk drives, optical storage drives, solid state storage devices, etc.) that reside within the computer system 110. Moreover, in thin-client or mobile implementations, additional processing/computation and data storage may be provided by an additional server component (not shown) connected to the computer system 110 via the network 170 or via a mobile device component (not shown).

The software applications 194 or routines 196 may include computer-readable instructions that cause the MPs 182 to implement data processing and communication functions. For example, in embodiments in which the computer system 110 is a data processing system configured to identify low-quality signals in electronic listings, the software applications 194 may include a text processing application 194*a* to ingest, normalize, and parse text which includes listing information of an electronic listing of a listing entity and entity information of the listing entity; a low-quality signal application 194*b* to generate a set of category scores for phrases of the text and identify low-quality signals based on the set of category scores; and a presentation application 194*c* to generate indications of the low-quality signals for presentation to end users of client computing devices 150. The software routines 196 may support the software applications 194 and may include routines such as a communication routine 196*a* to communicate with the sources 120 and 130 via the network 170, a scoring routine 196*b* to generate a set of category scores for single phrase, and a threshold routine 196*c* to determine, for each score of the set of category scores for one phrase, if each score satisfies a low-quality threshold. It should be understood that additional or alternative applications or routines may be included in the program memories 180, including other applications of the sort ordinarily stored on a computer system.

The display 162 and the speakers 164, along with other integrated or communicatively connected output devices (not shown), may be used to present information to users of the computer system 110. The display 162 may include any known or hereafter developed visual or tactile display technology, including LCD, OLED, AMOLED, projection displays, refreshable braille displays, haptic displays, or other types of displays. The speakers 164 may similarly include any controllable audible output device or component, which may include a haptic component or device. In some aspects, the speakers 164 may be communicatively connected speakers (e.g., headphones, Bluetooth headsets, docking stations with additional speakers, etc.). The inputs 166 may further receive events (e.g., instructions, selections, or other inputs) from a user of the computer system 110. The inputs 166 may include a physical or virtual keyboard, a microphone, virtual or physical buttons or dials, or other means of receiving information. In some aspects, the display 162 may include a touch screen or otherwise be configured to receive input from a user, in which case the display 162 and the inputs 166 may be combined.

The communication unit 168 may send or receive information from local or remote devices (e.g., data sources 120 or 130 or the server 140), either directly or through the network 170. The computer system 110 may also communicate with a router or the network 170 using the communication unit 168, which may manage communication between the controller 160 and external devices. The communication unit 168 may transmit and receive wired or wireless communications with external devices, using any suitable wireless communication protocol network, such as a wireless telephony network (e.g., GSM, CDMA, LTE, etc.), a Wi-Fi network (802.11 standards), a WiMAX network, a Bluetooth network, etc. Additionally, or alternatively, the communication unit 168 may also be capable of communicating using a near field communication standard (e.g., ISO/IEC 18092, standards provided by the NFC Forum, etc.). Furthermore, the communication unit 168 may provide input signals to the controller 160 via the I/O circuit 186. The communication unit 168 may also transmit sensor data, device status information, control signals, or other output from the controller 160 to the network 170.

The listing information sources 120 may be back-end components that store listing information of the electronic listings. The listing information sources 120 may provide listing information to the computer system 110 automatically or in response to a request. For example, in response to a user requesting access to an electronic listing, the listing information sources 120 may provide listing information of the electronic listing (e.g., in the form of providing the electronic listing itself for the user to view). In another example, the listing information sources 120 may provide listing information to the computer system 110 in response to the computer system 110 executing instructions for identifying low-quality signals of an electronic listing of a listing entity. The listing information sources 120 may be databases of electronic listings or listing information themselves, or the listing information sources 120 may be configured to receive electronic listings or listing information. The listing information sources 120 may be maintained or operated by an entity (which may be a listing entity corresponding to electronic listings, or may be an entity other than the listing entity corresponding to electronic listings, (e.g., an online marketplace)) and may be updated regularly.

The listing entity information sources 130 may be back-end components that store listing entity information of entities having electronic listings. The listing entity information sources 130 may provide electronic listing entity information to the computer system 110 automatically or in response to a request. For example, in response to a user requesting access to entity information of electronic listing (e.g., in the form of one or more reviews of the entity for the user to view), the listing entity information sources 130 may provide the listing entity information. In another example, the listing entity information sources 130 may provide listing entity information to the computer system 110 in response to the computer system 110 executing instructions for identifying low-quality signals of an electronic listing of a listing entity. The listing entity information sources 130 may be databases of listing entity information themselves, or the listing entity information sources 130 may be configured to receive listing entity information. The listing entity information sources 130 may be maintained or operated by an entity (which may be an entity corresponding to the listing entity information, or may be an entity other than the entity corresponding to the listing entity information (e.g., an online marketplace)) and may be updated regularly.

The server 140 may be a back-end component that stores information received from the front-end components such as the computer system 110 via the network 170. In some embodiments, a plurality of servers may perform distinct or overlapping functions. For example, a first server may provide data in response to user requests and store information associated with such user requests, while a second server may perform analysis on the data provided by the first server. Alternatively, one server 140 may perform any or all of the functions described herein, such as performing at least some of the functions of the computer system 110. The server 140 may include a controller 142 to process data and run software programs, applications, or routines stored in a program memory 144 as executable instructions, and the server 140 may further include or be communicatively connected to a database 146 for data storage and retrieval.

The one or more client computing devices 150 may be front-end components that may be any number of suitable computing devices (e.g., a desktop computer, a notebook computer, a netbook computer, a smartphone, a tablet computer, a wearable electronic device, or similar mobile or stationary computing device capable of receiving, processing, and displaying information). The client computing devices 150 may include one or more internal sensors, which may facilitate user input to the client computing devices 150, such as by enabling the user to issue voice commands via a microphone (not shown) or allow keyboard or touch-based input. The client computing devices 150 may include one or more controllers, one or more displays, one or more speakers, one or more inputs, a one or more communication units, one or more navigation units, one or more image/video capturing units, or any other suitable components (not shown). The components of the client computing devices 150 may be interconnected via an address/data bus or other means. The client computing devices 150 may be used by users to access, view, or interact with electronic listings, listing entity reviews, or online marketplaces. The users of the client computing devices 150 may be potential customers for goods or services corresponding to the electronic listings, listing entity reviews, or online marketplaces.

Figure 2A:
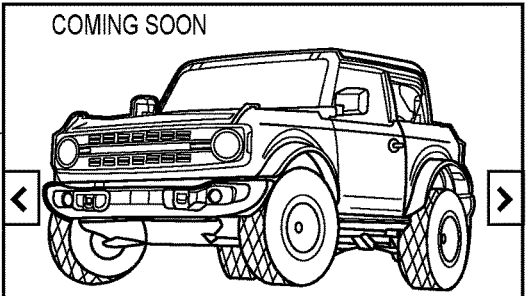
FIG. 2A illustrates an exemplary electronic listing with listing information.

FIG. 2A illustrates an exemplary electronic listing 200A with listing information corresponding to a vehicle for sale. The electronic listing 200A, as illustrated, includes listing information such as: a heading 202A, a price 204A, badges 206A, seller information 208A, structured data 210A, and a text description 212A, and images 214A, as well as other data/information that is not specifically enumerated. The electronic listing 200A may be hosted on an online marketplace which includes one or more other electronic listings.

The electronic listing 200A may be written by an author who is a seller of the vehicle or who is writing on behalf of the seller. The seller may be a private seller or a dealer. As illustrated, the heading 210A includes a year, make, and model of the vehicle. The price 204A may include a listed price or, in some embodiments, a bid price if the electronic listing 200A corresponds to an auction. The badges 206A may include indicators about pricing of the vehicle, popularity of the vehicle, features of the vehicle, or other information about the vehicle. The seller information 208A may include listing entity information of the seller of the vehicle and may include aggregated reviews, a location of the entity, contact information of the entity, or other information about the entity. The structured data 210A may include features of the vehicle, identification of the vehicle, safety information of the vehicle, ratings of the vehicle, a manufacturer of the vehicle, a model of the vehicle, mileage of the vehicle, repair/accident/recall/ownership history of the vehicle, warranty information of the vehicle, financing information for the vehicle, location of the vehicle, or other information about the vehicle or the seller. The text description 212A may include any of the information included in 202A-210A, which is presented in an unstructured or semi-structured format. In some embodiments, the text description 212A may include special pricing information such as sales, discounts, taxes, fees, registration, or other costs or savings which may modify the price 204A to determine an amount actually paid by a buyer when buying the vehicle. The images 214A may include images of the vehicle or images of other information related to the vehicle or the seller. In some embodiments, videos of the vehicle may be included in the electronic listing 200A.

In some embodiments, some or all of the listing information 202A-214A included in the electronic listing have may been auto-generated. There may be limits on how many words or characters may be included in some or all of the listing information 202A-214A. There may also be limits on which words, phrases, images, videos, etc. are allowed or disallowed from being included in some or all of the listing information 202A-214A. The listing information 202A-214A may include formatting included beyond just plain text; for example, the text description 212A may have paragraphs breaks, bolding, underlining, italicizing, highlighting, or other formatting included. The formatting may have been applied to the listing information 202A-214A by the author. There may be limits on which types of formatting are allowable in the listing information 202A-214A.

FIG. 2B illustrates an exemplary listing entity review 200B with listing entity information corresponding to a listing entity selling one or more vehicles. The listing entity review 200B, as illustrated, includes listing entity information such as: a review score 202B and a text review 204B, as well as other data/information that is not specifically enumerated. While only one example of the listing entity review 200B is shown, the listing entity may have a plurality of reviews. The listing entity review 200B may be hosted on an online marketplace which includes one or more other listing entity reviews.

The listing entity review 200B may be written by an author who may have bought a vehicle from the listing entity, or by an author who may not have bought a vehicle from the listing entity. The listing entity may be a private seller or a dealer. The review score 202B may be a single review score (e.g., scale or 1-10, scale of 1-5, letter grade, nominal descriptor, etc.), or the review score 202B may be multiple review scores, such as having multiple scoring categories or sub-categories. The text review 204B may include text written by the author and may describe information about the author's experience in interacting with, communicating with, or considering/actually purchasing from the listing entity. The text review 204B may include structured or unstructured data and may include formatting included beyond just plain text; for example, the text review 204B may have paragraphs breaks, bolding, underlining, italicizing, highlighting, or other formatting included which may have been applied by the author.

FIG. 3A illustrates an exemplary process 300A for ingesting listing information and identifying low-quality signals. The process 300A depicts listing information 302A including text of an electronic listing of a vehicle. The process 300A further depicts normalized listing information 304A corresponding to the listing information 302A. The process 300A further depicts a data table 306A that includes a plurality of phrases parsed from the normalized listing information 304A and an identification, for each phrase of the plurality of phrases, of whether the phrase satisfies a low-quality threshold and, accordingly, is a low-quality phrase of a low-quality signal. The process 300A further depicts a low-quality signal presentation 308A including an indication of low-quality signals via indicating low-quality phrases and the text of the electronic listing. At least some of the process 300A may use the system 100 of FIG. 1.

The listing information 302A may include data/information which may be the same as or similar to the data/information included in the electronic listing 200A, in whole or in part. For example, the listing information 302A may include text which may be the same as or similar to the text included in the text description 212A or the structured data 210A. The listing information 302A may have been provided by the listing information sources 120 to the server 140 or the computer system 110 via the network 170. The listing information sources 120 may have provided the listing information 302A either automatically or in response to a request. The request may have originated from the computer system 110, for example, as part of a periodic (e.g., hourly or daily) review of new or updated listings. The listing information 302A may be stored by the database 146 of the server 140 or at least one of: the RAM 184, the MP 182 or the data storage 192 of the computer system 110.

The normalized listing information 304A may correspond to the listing information 302A and may be generated (e.g., via the server 140 or the computer system 110) by normalizing the listing information 302A. The normalization may be universal, (i.e., applicable to all data/information in all circumstances) or the normalization may be more specific (i.e., different for different data/information or different circumstances). Normalizing the listing information 302A may include "cleaning" the data/information included in the listing information 302A. Normalizing language/terminology of the two datasets may include standardizing acronyms, synonyms, spelling, spacing, capitalization, slang, industry terms, etc. For example, as illustrated, the listing information 302A includes the phrase "Price doesnt include CA taxes, title, fees, and accessories," which is normalized to read "PRICE DOES NOT INCLUDE CALIFORNIA TAXES, TITLE, FEES, AND ACCESSORIES" in the normalized listing information 304A, thereby normalizing for incorrect spelling (e.g., "typos"), acronyms/shorthand, contractions, capitalization, etc. Normalizing may include replacing one or more characters of the text of the listing information 302A with characters from a predetermined list of characters, words, or phrases. Referring to the previous example, the text "doesnt" may be replaced with the text "DOES NOT" from the predetermined list, as the closest and most likely match based on characters, context, common typos or acronyms, etc. Normalizing for language/terminology may use a machine learning model such as natural language processing which may include identifying words, phrases, or groups of words sharing common attributes, such as root, general meanings, formatting, sentence structure, etc. In other examples, normalizing the listing information 302A may include normalizing data types other than strings of text. For example, it may be desirable to be able to relate, and accordingly normalize, text of a first instance of data with an image of a second instance of data (e.g., images of a car's interior that has stains on the interior may be normalized to "DIRTY INTERIOR," or images of a large scratch on the driver's side door panel may be normalized to "DRIVER'S SIDE DOOR PANEL DAMAGE," etc.). Normalizing image data, video, or audio data may include using machine learning and computer vision techniques, such as object or speech recognition. The normalized listing information 304A may be stored by the database 146 of the server 140 or at least one of: the RAM 184, the MP 182 or the data storage 192 of the computer system 110.

The data table 306A may include a plurality of phrases parsed from the normalized listing information 304A of the electronic listing. In some embodiments, parsing the normalized listing information 304A into the plurality of phrases may include applying a natural language processing model to the text to identify the plurality of phrases. The natural language processing model may be a machine learning model. Such natural language processing may include identifying words, phrases, or groups of words sharing common attributes, such as root, general meanings, formatting, sentence structure, etc. As illustrated, the normalized listing information 304A may be parsed into phrases according to sentence breaks, such that each phrase is a sentence. For example, "SUBJECT TO CREDIT APPROVAL" may be parsed as a phrase at least because of a first period located before the word "SUBJECT" and a second period located after the word "APPROVAL." In some embodiments, not all text included in the normalized listing information 204A will be included as phrases in the data table 304A, for example, certain words or characters may be omitted from the plurality of phrases. Parsing the normalized listing information 304A may be performed by the server 140 or the computer system 110. Parsing the normalized listing information 304A may be initiated either automatically or in response to a request. The request may have originated from a client computing device 150, for example, due to the user of the client computing device 150 requesting access to a webpage including the vehicle listing. The plurality of phrases of the data table 306A may be stored by the database 146 of the server 140 or at least one of: the RAM 184, the MP 182 or the data storage 192 of the computer system 110.

The data table 306A may further include an identification, for each phrase of the plurality of phrases, of whether the phrase satisfies a low-quality threshold and, accordingly, is a low-quality phrase of a low-quality signal (i.e., "YES" if the low-quality threshold is satisfied, "NO" if the low-quality threshold is not satisfied, as illustrated). Satisfying a low-quality threshold may include a score being above the low-quality threshold, below the low-quality threshold, equal to the low-quality threshold, or some other suitable manner of satisfying the low-quality threshold. Determining whether a phrase satisfies a low-quality threshold may be based on, for each phrase of the plurality of phrases, a respective set of category scores. Each of the low-quality categories may correspond to behavior associated with deceptive practices which some entities may use in electronic listings. A respective set of category scores may include scores for each of one or more low-quality categories, such as fees, taxes and registration, incentives, financing, cosmetic, mechanical, accident or salvage, or inventory, as illustrated. Deceptive pricing may include one or more of: the fees category, the taxes and registration category, the incentives category, or the financing category. The fees category of the set of category scores may be associated with electronic listings which include prices that exclude (i.e., do not "factor-in") additional fees (e.g., electronic filing, customer service, administrative, paperwork, handling, dealership, processing, documentation, reconditioning, certification, shipping etc. fees), additional payment for dealer installed add-ons, additional payment for required warranty, or additional payment for market adjustments. The taxes and registration category of the set of category scores may be associated with electronic listings which include prices which exclude (i.e., do not "factor-in") taxes, registration, or any government-required fees. The incentives category may be associated with electronic listings which include prices which include (i.e., "factor-in") rebates, incentives, bonus cash, employee discounts, sales, etc. that are not available to every customer or which every customer is not eligible to receive. The financing category may be associated with electronic listings which are only available (or only have a certain price) through certain financing (e.g., financing though only a certain entity, or only at a certain rate, or only with a certain down payment, etc.) or through not using any financing (i.e., "cash only").

Deceptive condition may include one or more of: the cosmetic category, the mechanical category, or the accident/salvage category. The cosmetic category may be associated with electronic listings for a good with cosmetic defects, damage, or other undesirable attributes (e.g., dirty, dented, scratched, cracked, stained, ripped, scuffed, etc.). The mechanical category may be associated with electronic listings for a good with mechanical defects, damage, or other undesirable attributes (e.g., good not working in whole or in part, good would not pass inspection, poor service history, etc.). The accident or salvage category may be associated with electronic listings for a good which has been in an accident or is salvaged (e.g., good has unrepaired accident damage, good has a salvage title, good has a history with an accident, etc.). Deceptive inventory may include the inventory category. The inventory category may be associated with electronic listings for a good which is not currently available for purchase (e.g., good may have never been available for purchase, good may have already been sold, good may only be purchased by certain buyers, good is not in possession of listed seller, good that is available is different from advertised good, etc.). While only the mentioned categories are illustrated in FIG. 3A, other low-quality categories may be included in some embodiments such as a trade-in category (e.g., a price in the electronic listing for a good assumes a different good is being "traded-in" during the purchase of the good), a hedging category (e.g., a price included in the electronic listing is subject to change without notice, seller is not responsible for pricing errors, a buyer must call to receive a certain price, price is not listed, seller refuses to honor a price included in the electronic listing, etc.), or other categories associated with deceptive selling practices.

The scores of the respective set of category scores may be generated for each low-quality category via a scoring algorithm. The scoring algorithm may be universal (i.e., applicable to all users in all circumstances), or the scoring algorithm may be more specific (i.e., different for different users with different user profiles or different circumstances). The scoring algorithm may be generated by training a machine learning model. The machine learning model may be trained using a supervised or unsupervised machine-learning program or algorithm. The machine-learning program or algorithm may employ a neural network, which may be a convolutional neural network, a deep learning neural network, or a combined learning module or program that learns in two or more features or feature datasets in a particular areas of interest. In one embodiment, a generative adversarial neural network may be used. The machine-learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, or other machine-learning algorithms or techniques. Machine-learning may involve identifying and recognizing patterns in existing data in order to facilitate making predictions for subsequent data. In some embodiments, due to the processing power requirements of training machine learning models, the selected model may be trained using additional computing resources (e.g., cloud computing resources) based upon data provided by the server 140. A training data set may include phrases which are related to the scoring algorithm. For example, if the scoring algorithm is being trained for use in vehicle electronic listings, the training data set may include phrases related to vehicles. The training data set may be unlabeled, or the training data set may be labeled, such as by a human. In some embodiments, training data set may include negation sets with varying syntax or morphology, random sentence concatenations to introduce more varied sentence lengths and combinations, typographical errors (e.g., spelling, punctuation, etc.), or other complexities which may be experienced by the scoring algorithm when in use.

Training of the scoring algorithm may continue until at least one model of the scoring algorithm is validated and satisfies selection criteria to be used as a predictive model. In one embodiment, each scoring algorithm may be validated using a second subset of the training data set to determine algorithm accuracy and robustness. Such validation may include applying the scoring algorithm to the training data set of the second subset of training data set to predict scores of some phrases. The scoring algorithm may then be evaluated to determine whether the scoring algorithm performance is sufficient based upon the validation stage predicted scores. The sufficiency criteria applied may vary depending upon the size of the training data set available for training, the performance of previous iterations of scoring algorithms, or user-specified performance requirements.

In some embodiments, a multi-label text classifier, such as a BERT (Bidirectional Encoder Representations from Transformers) may be included in the scoring algorithm. The BERT model uses a transformer, which is an attention mechanism that learns relations between words/phrases (or sub-words/sub-phrases) in text by reading an entire sequence of words/phrases at once to learn the words based on their surrounding context. In many situations, multi-label text classifiers have benefits such as speed, performance, tenability, and contextual understanding. Using a multi-label text classifier such as BERT may include fine-tuning with a trainer that overrides a loss function. From an implementation standpoint, for the multi-label text classifier, a sigmoid activation function in a final layer and binary cross-entropy loss may be used. In some embodiments, a distilled network may be used to approximate BERT or other larger multi-label text classifiers. For example, the DistilBERT HuggingFace transformer model, which is a distilled version of BERT, may be included in the scoring algorithm.

In some embodiments, the scoring algorithm may be evaluated using F1 score (an evaluation metric that is used to express the performance of a machine learning model or classifier that gives information about precision and recall of the model). The F1 score may be determined by running the scoring algorithm against a new data set that the model has not seen. For example, a data set may be used which contains 100 sentences composed of positive (e.g., "the online price excludes all dealership fees") and negative examples (e.g., "the online price includes all dealership fees") for each of the categories the scoring algorithm scores against.

In some embodiments, the scoring algorithm may be validated using feedback. The feedback may be indicative of inferred values of the low-quality signals. In some embodiments, the feedback may be user feedback. The user feedback may include asking a user if certain phrases are important to their purchase decision making process or if they believe certain phrases may be deceptive. The user feedback may include behavior such as at least one of: cursor movement, clicking, highlighting or copying text, scrolling behavior, zooming behavior, or other behavior of the user on the electronic listing. The behavior may be used to determine if the scoring algorithm is accurate in its scoring. For example, if a user hovers their cursor over a phrase for a certain amount of time, this may be an indication the user finds the phrase to contain information important to their purchase decision making process, or it may be an indication that the phrase is possibly deceptive. When a scoring algorithm has not achieved sufficient performance, additional training may be performed, which may include refinement of the scoring algorithm or retraining on a different first subset of the training data set, after which the new scoring algorithm may again be validated and assessed. When the scoring algorithm has achieved sufficient performance, the scoring algorithm may be stored for later use. The server 140 or the computer system 110 may store the one or more selected scoring algorithms for later use according to the methods and techniques disclosed herein. The scoring algorithms may be stored as sets of parameter values or weights for analysis of further user interaction data or user data, which may also include analysis logic or indications of model validity in some instances. In some embodiments, trained predictive models may be stored in the database 146 associated with server 140.

Scoring the plurality of phrases may be performed by the server 140 or the computer system 110. Scoring the plurality of phrases may have been initiated either automatically or in response to a request. The request may have originated from the computer system 110, for example, either as part of an automated script or due to the user of the computer system 110 selecting to analyze one or more listings (e.g., a batch of new listings or all listings associated with a specified listing entity). The sets of category scores corresponding to the plurality of phrases of the data table 306A may be stored by the database 146 of the server 140 or at least one of: the RAM 184, the MP 182 or the data storage 192 of the computer system 110.

Once the sets of category scores for the plurality of phrases are determined, it may be determined, for each phrase, which, if any, of its scores of the respective set of category scores satisfies a low-quality threshold. In the example data table 306A, "YES" may indicate that a certain phrase has a certain score corresponding to a certain low-quality category which has satisfied a certain threshold.

For example, the phrase "INTERIOR IN IMMACULATE CONDITION" may have a score corresponding to the cosmetic category which may satisfy a low-quality threshold because, for example, while the vehicle is described as having an interior in good cosmetic condition, photos of the vehicle may be identified (e.g., via computer vision/machine learning) as including stains on the vehicle interior that are inconsistent with a vehicle being described as having an interior in good cosmetic condition. Therefore, the electronic listing may be considered to be associated with deceptive practices regarding reporting cosmetic condition. Accordingly, low-quality signals may be identified with the electronic listing.

In another example, the phrase "PRICE DOES NOT INCLUDE CALIFORNIA TAXES, TITLE, FEES, AND ACCESSORIES" may have a score corresponding to the fees category and a score corresponding to the taxes and registration category which each may satisfy a low-quality threshold because, for example, the price for the vehicle excludes (i.e., does not "factor-in") the cost of fees and taxes. Therefore, the electronic listing may be considered to be associated with deceptive practices regarding fees and taxes and registration. Accordingly, low-quality signals may be identified with the electronic listing.

In another example, the phrase "DISPLAYED SALE PRICE AVAILABLE IF FINANCED THROUGH OUR DEALERSHIP" may have a score corresponding to the financing category which may satisfy a low-quality threshold because, for example, the price for the vehicle is only available if certain financing is used. Therefore, the electronic listing may be considered to be associated with deceptive practices regarding financing. Accordingly, low-quality signals may be identified with the electronic listing.

In another example, the phrase "VISIT US TODAY AND BRING YOUR STUDENT OR MILITARY IDENTIFICATION FOR ADDITIONAL DISCOUNTS" may have a score corresponding to the incentives category which may not satisfy a low-quality threshold because, for example, while a special price for the vehicle is only available to certain buyers (students and military), the special price is not the listed price included in the electronic listing. Accordingly, for at least this phrase, the electronic listing may be considered not to be associated with deceptive practices regarding incentives.

If one or more scores of the sets of category scores for an electronic listing satisfy a low-quality threshold, the electronic listing may be associated with one or more low-quality signals. In some embodiments, there may be different thresholds corresponding to some or all of the low-quality categories. In other embodiments, there may be a single threshold corresponding to all the low-quality categories. In further embodiments, there may be a plurality of low-quality thresholds corresponding to a single low-quality category. For example, there may be two low-quality thresholds, wherein a phrase may satisfy one or both of the two low-quality thresholds. In some embodiments, the low-quality threshold may not be a score, but some other suitable cutoff. For example, the low-quality threshold may be a rule or set of rules such that, for a certain phrase, a certain low-quality category of the one or more low-quality categories will satisfy the low-quality threshold when the certain low-quality category has a higher score than the other low-quality categories of the one or more low-quality categories.

Determining whether each phrase of the plurality of phrases of the data table 304A satisfies a low-quality threshold corresponding to one or more low-quality categories may be performed by the server 140 or the computer system 110. Determining whether each phrase of the plurality of phrases of the data table 304A satisfies a low-quality threshold corresponding to one or more low-quality categories may have been initiated either automatically or in response to a request, such as from the computer system 110. The determination of whether each phrase of the plurality of phrases of the data table 306A satisfies a low-quality threshold corresponding to one or more low-quality categories may be stored by the database 146 of the server 140 or at least one of: the RAM 184, the MP 182 or the data storage 192 of the computer system 110.

The process 300A further depicts a low-quality signal presentation 308A including an indication of low-quality signals via indicating low-quality phrases and the text of the electronic listing. In the illustrated example, phrases of the text of the normalized listing information 304A which correspond to low-quality signals are flagged. In this example, the three phrases correspond to low-quality signals and are flagged as being low-quality phrases. In some embodiments different flags may correspond to different low-quality categories associated with the low quality signals. For example, as illustrated, different flags may be used for each of the phrases: "INTERIOR IN IMMACULATE CONDITION," "PRICE DOES NOT INCLUDE CALIFORNIA TAXES, TITLE, FEES, AND ACCESSORIES," and "DISPLAYED SALE PRICE AVAILABLE IF FINANCED THROUGH OUR DEALERSHIP," as each of the three phrases correspond to different low-quality categories (i.e., cosmetic category, fees category and taxes and registration category, and financing category, respectively).

The low-quality signal presentation 308A depicts the low-quality phrases as being highlighted, as illustrated. However, low-quality phrases may be flagged in a variety of different ways, including by one or more of: highlighting the low-quality phrases, bolding the low-quality phrases text, underlining the low-quality phrases, italicizing the low-quality phrases, coloring the low-quality phrases to be a color different from a color of other text (the other text being text of the low-quality signal presentation 308A which is not the low-quality phrases), marking the low-quality phrases with a graphic or text indication, or sizing the low-quality phrases to be a font size different from a font size of the other text. In some embodiments, and as illustrated, each of the low-quality phrases may be flagged differently to reflect different low-quality categories corresponding to each of the low-quality phrases. As illustrated, each of the four low-quality phrases are highlighted in a color dependent on the low-quality category to which each of the four low-quality phrases corresponds. In some embodiments, the low-quality phrases may be displayed as separate from the other text, such as by displaying the low-quality phrases in a different section of the electronic listing, possibly in a different structured or unstructured data type. In some embodiments, the low-quality signal presentation 308A is displayed on a display of the client computing device 150 when a user views the electronic listing. In other embodiments, the low-quality signal presentation 308A is read aloud to the user using a speaker of the client computing device 150. In this embodiment where the low-quality signal presentation 308A is read aloud to the user (e.g., as audio output of a digital assistant device), different types of flagging of the low-quality phrases may be used, such as, for example: reading the low-quality phrases with different inflections than the other text, reading the low-quality phrases at a different volume than the other text, adding pauses around the low-quality phrases, or not reading some or all of the other text.

The low-quality signal presentation 308A may be generated by the computer system 110 or the server 140 and stored (e.g., in the database 146) for later presentation to users of client computing devices 150. Upon a request from a client computing device 150 to present the electronic listing, the server 140 may cause the low-quality signal presentation 308A to be included as part of or together with the electronic listing for presentation to the user via the client computing device 150.

FIG. 3B illustrates an exemplary process for ingesting listing entity information and identifying low-quality signals. The process 300B depicts listing entity information 302B including text of a listing entity review. The process 300B further depicts normalized listing entity information 304B corresponding to the listing entity information 302B. The process 300B further depicts a data table 306B that includes a plurality of phrases parsed from the normalized listing entity information 304B and an identification of whether each phrase satisfies a low-quality threshold and, accordingly, is a low-quality phrase of a low-quality signal. The process 300B further depicts a low-quality signal presentation 308B including an indication of low-quality signals via indicating low-quality phrases and the text of the listing entity review. At least some of the process 300B may use the system 100 of FIG. 1 and may be the same as or similar to the process 300A.

The listing entity information 302B may include data/ information which may be the same as or similar to the data/information included in the listing entity review 200B, in whole or in part. For example, the listing entity information 302B may include text which may be the same as or similar to the text included in the text review 204B or the review score 202B. The listing entity information 302B may have been provided by the listing information sources 120 to the server 140 or the computer system 110 via the network 170. The listing information sources 120 may have provided the listing entity information 302B either automatically or in response to a request. The request may have originated from the computer system 110, for example, either as part of an automated script or due to the user of the computer system 110 selecting to analyze one or more reviews (e.g., a batch of new listing entity reviews or all reviews associated with a specified listing entity). The listing entity information 302B may be stored by the database 146 of the server 140 or at least one of: the RAM 184, the MP 182 or the data storage 192 of the computer system 110.

The normalized listing entity information 304B may correspond to the listing entity information 302B and may be generated (e.g., via the server 140 or the computer system 110) by normalizing the listing entity information 302B. Normalizing the listing entity information 302B to generate the normalized listing entity information 304B may be the same as or similar to the previously-described processes of normalizing the listing information 302A to generate the normalized listing information 304A. The normalized listing entity information 304B may be stored by the database 146 of the server 140 or at least one of: the RAM 184, the MP 182 or the data storage 192 of the computer system 110.

The data table 306B may include a plurality of phrases parsed from the normalized listing entity information 304B of the electronic listing. Parsing the normalized listing entity information 304B into the plurality of phrases may be the same as or similar to the previously-described processes of parsing the normalized listing information 304A. The plurality of phrases may be stored by the database 146 of the server 140 or at least one of: the RAM 184, the MP 182 or the data storage 192 of the computer system 110.

Generating an identification for each phrase of whether the phrase satisfies a low-quality threshold and, accordingly, is a low-quality phrase included in data table 306B may be the same as or similar to the previously-described processes of identifying low-quality phrases in the data table 306A. At least one of (i) sets of category scores corresponding to the plurality of phrases of the normalized listing entity information 304B, or (ii) a determination of whether each phrase of the plurality of phrases satisfies a low-quality threshold corresponding to one or more low-quality categories may be stored by the database 146 of the server 140 or at least one of: the RAM 184, the MP 182 or the data storage 192 of the computer system 110.

The process 300B may depict a low-quality signal presentation 308B including an indication of low-quality signals via indicating low-quality phrases and the text of the electronic listing. The low-quality signal presentation 308B may be the same as or similar to the low-quality signal presentation 308A. The low-quality signal presentation 308B may be stored by the database 146 of the server 140 or at least one of: the RAM 184, the MP 182 or the data storage 192 of the computer system 110.

Figure 4:
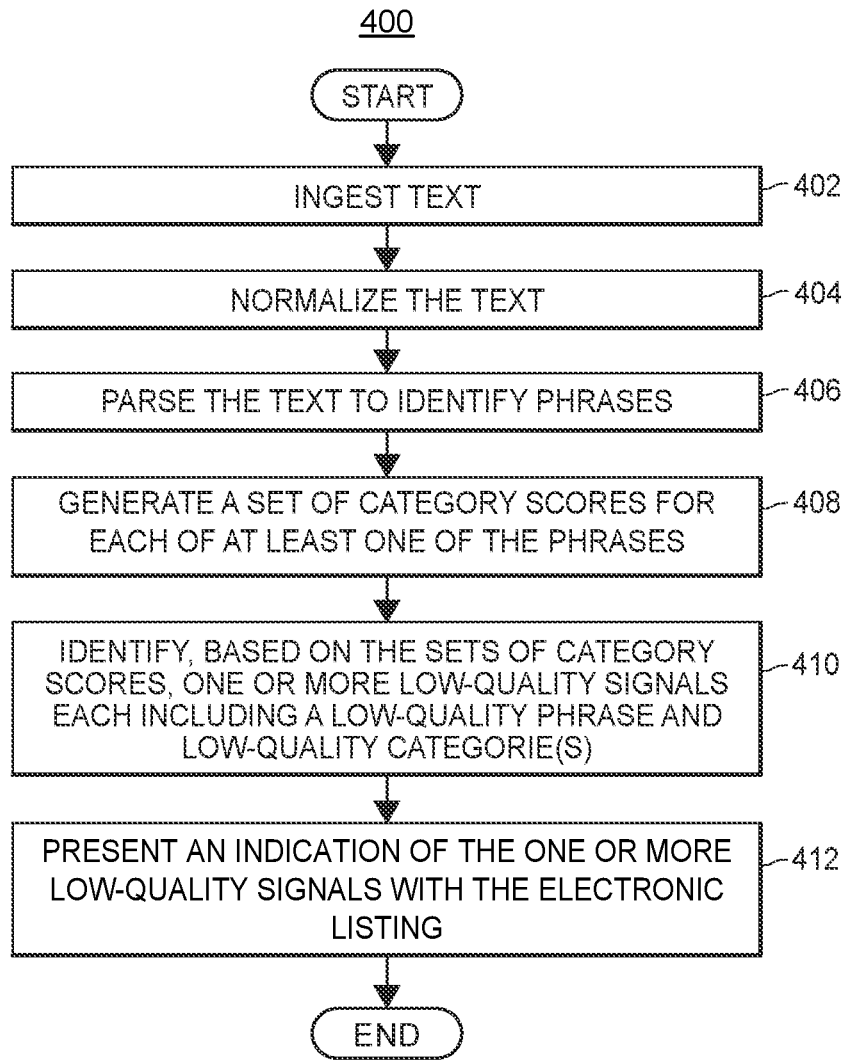
FIG. 4 illustrates a flow diagram of an exemplary method for identifying low-quality signals of an electronic listing of a listing entity.

FIG. 4 illustrates a flow diagram of an exemplary method 400 for identifying low-quality signals of an electronic listing of a listing entity. The method 400 includes ingesting text which includes (i) listing information of the electronic listing and (ii) listing entity information of the listing entity (block 402). The method 400 further includes normalizing the text which includes replacing first text of the text with second text from a list of predetermined text (block 404). The method 400 further includes parsing the text to identify a plurality of phrases included in the text (block 406). The method 400 further includes generating a respective set of category scores for each of at least one of the plurality of phrases by applying a scoring algorithm (block 408), wherein the respective set of category scores includes a plurality of scores for each of a plurality of low-quality categories. The method 400 further includes, identifying one or more low-quality signals, which each include (i) a respective low-quality phrase that is a phrase of the at least one of the plurality of phrases and that corresponds to at least one score of the respective set of low-quality category scores that satisfies a low-quality threshold, and (ii) at least one of the plurality of low-quality categories that corresponds to the at least one score that satisfies the low-quality threshold (block 410). The method 400 further includes presenting an indication of the one or more low-quality signals together with the electronic listing to a user via a graphical user interface (block 412). At least some of the method 400 may use the system 100 of FIG. 1 or may be the same as or similar to the process 300A or the process 300B.

The method 400 may begin, in some embodiments, with ingesting text which includes (i) listing information of the electronic listing and (ii) listing entity information of the listing entity (block 402). The text may have been provided by one or more servers (e.g., server 140) or sources (e.g., listing information sources 120 or listing entity information sources 130) via the network 170. The electronic listing may be for a good or service for sale, such as a vehicle, and may be the same as or similar to, for example, the electronic listing 200A. The listing information may be data/information included in or relating to the electronic listing, which may be the same as or similar to, for example, the listing information 302A. The listing entity information of the listing entity data/information about the listing entity, which may be included in the electronic listing or external sources written about the entity (e.g., the listing entity information may be included in a review which may be the same as or similar to the listing entity review 200B). The listing entity information may be the same as or similar to, for example, the listing entity information 302B. Ingesting the text may have been initiated either automatically or in response to a request. The request may have originated from the computer system 110, for example, either as part of an automated script or due to the user of the computer system 110 selecting to analyze one or more texts relating to electronic listings. In some embodiments the text may have been provided to the computer system 110 as a result of user input, or it may be initiated automatically (e.g., the computer system 110 automatically initiates ingesting of the text without a user requesting the computer system 110 to do so). The text may be stored by the database 146 of the server 140 or at least one of: the RAM 184, the MP 182 or the data storage 192 of the computer system 110.

At block 404, the text may be normalized. The normalization may be universal, (i.e., applicable to all data/information in all circumstances) or the normalization may be more specific (i.e., different for different data/information or different circumstances). Normalizing the text may include "cleaning" the text. Normalizing language/terminology of the two datasets may include standardizing acronyms, synonyms, spelling, spacing, capitalization, slang, industry terms, etc. Normalizing may include replacing one or more characters of the text with characters from a predetermined list of characters, words, or phrases. Normalizing for language/terminology may use a machine learning model such as natural language processing which may include identifying words, phrases, or groups of words sharing common attributes, such as root, general meanings, formatting, sentence structure, etc. In other examples, normalizing the listing information 302A may include normalizing data types other than strings of text. For example, it may be desirable to be able to relate, and accordingly normalize, text of a first instance of data with an image of a second instance of data. Normalizing image data, video, or audio data may include using machine learning and computer vision techniques, such as object or speech recognition. The text, after being normalized, may be stored by the database 146 of the server 140 or at least one of: the RAM 184, the MP 182 or the data storage 192 of the computer system 110.

At block 406, the text may be parsed to identify a plurality of phrases in the text. Parsing the text into the plurality of phrases may include applying a natural language processing model to the text to identify the plurality of phrases. In some examples, a phrase may be defined by a sentence (i.e., each phrase of the plurality of phrases is one sentence). In some examples, a phrase may be defined by a number of words, a number of characters, or some other suitable demarcation in the text. The natural language processing model may be a machine learning model. Such natural language processing may include identifying words, phrases, or groups of words sharing common attributes, such as root, general meanings, formatting, sentence structure, etc. Parsing the text of the electronic listing may be performed by the server 140 or the computer system 110. Parsing the text may have been initiated either automatically, or in response to a request. The plurality of phrases may be stored by the database 146 of the server 140 or at least one of: the RAM 184, the MP 182 or the data storage 192 of the computer system 110.

At block 408, a respective set of category scores for each of at least one of the plurality of phrases may be generated by applying a scoring algorithm, wherein the respective set of category scores includes a plurality of scores for each of a plurality of low-quality categories. Each of the low-quality categories may correspond to behavior associated with deceptive practices which some entities may use in electronic listings. A respective set of category scores may include scores for each of one or more low-quality categories, such as fees, taxes and registration, incentives, financing, cosmetic, mechanical, accident or salvage, or inventory. The scoring algorithm may be universal, (i.e., applicable to all users in all circumstances) or the scoring algorithm may be more specific (i.e., different for different users with different user profiles or different circumstances). In embodiments where the scoring algorithm is not universal, circumstances which may influence scores of phrases may include, for example, location of the vehicle, time of day, time of year, weather, sales data for the vehicle or similar vehicles, economic or social trends, etc. In some embodiments, the scoring algorithm may be configured to exclude (e.g., by giving scores of zero) certain generic phrases of the plurality of phrases (e.g., repeated phrases identified as being frequently repeated across all listings during training of or specification of the scoring algorithm, or phrases repeated in multiple listings by the same listing with a frequency above a threshold frequency). Such listing entity-specific repeated phrases may be excluded or given reduced scores due to their generic nature with respect to listings of the particular listing entity. The scoring algorithm may be stored as sets of parameter values or weights for analysis of further user interaction data or user data, which may also include analysis logic or indications of model validity in some instances. The scoring algorithm may be stored by the database 146 of the server 140 or at least one of: the RAM 184, the MP 182 or the data storage 192 of the computer system 110. Scoring the plurality of phrases may be performed by the server 140 or the computer system 110. Scoring the plurality of phrases may have been initiated either automatically or in response to a request (e.g., a request from the computer system 110). The respective sets of category scores corresponding to the plurality of phrases may be stored by the database 146 of the server 140 or at least one of: the RAM 184, the MP 182 or the data storage 192 of the computer system 110.

At block 410, one or more low-quality signals, each including a low-quality phrase and one or more low-quality categories, may be identified based on each of the sets of category scores. The low-quality phrase of each of the one or more low-quality signals may be a phrase that corresponds to at least one score of the respective set of low-quality category scores that satisfies a low-quality threshold. The low-quality categories may be at least one of the plurality of low-quality categories that corresponds to the at least one score that satisfies the low-quality threshold. The low-quality threshold may be a numeric score a phrase must equal or exceed in order to be identified as a low-quality phrase. In some embodiments, if none of the plurality of phrases correspond to a score meeting the low-quality threshold, none of the plurality of phrases may be included in low-quality signals. In other embodiments, if none of the plurality of phrases correspond to a score meeting the threshold, a phrase of the plurality of phrases corresponding to a highest score may instead be identified and included in a low-quality signal. In some embodiments, there may be a plurality of low-quality thresholds. In further embodiments, the low-quality threshold may not be a score, but some other cutoff, such as a percentile, wherein phrases corresponding to scores which are at least in the top percentile range of scores may be identified and included in low-quality signals. Identifying low-quality signals may be performed by the server 140 or the computer system 110. Identifying low-quality signals may have been initiated either automatically or in response to a request. The low-quality signals may be stored by the database 146 of the server 140 or at least one of: the RAM 184, the MP 182 or the data storage 192 of the computer system 110.

At block 412, an indication of the one or more low-quality signals, together with the electronic listing, may be presented to a user via a graphical user interface. In some embodiments, the low-quality signals may be presented together with the electronic listing via presenting the low-quality phrases "in-line" with other text (the other text being text of the text which is not the one or more low-quality phrases). Presenting the indication the low-quality phrases in-line with the other text may include flagging the low-quality phrase (e.g., via highlighting the low-quality phrases, bolding the low-quality phrases text, underlining the low-quality phrases, italicizing the low-quality phrases, coloring the low-quality phrases to be a color different from a color of other text, marking the low-quality phrases with a graphic, or sizing the low-quality phrases to be a font size different from a font size of the other text, etc.). In some embodiments, presenting the low-quality signals together with the electronic listing may include presenting the low-quality phrases in a manner that is not in-line with the other text, such as by displaying the low-quality phrases in a first section of the graphical user interface and presenting the electronic listing in a second section of the graphical user interface. In some embodiments, the indication of the low-quality signals is presented together with the electronic listing on a display of a client computing device 150. In other embodiments, the indication of the low-quality signals is presented together with the electronic listing via reading aloud to the user using a speaker of a client computing device 150. The indication the low-quality phrases in-line with the other text may be presented either automatically or in response to a request, such as a request from the client computing device 150. In the embodiment where the server 140 generates the indication of the low-quality signals together with the electronic listing, the client computing device 150 may receive the indication of the low-quality signals together with the electronic listing from the server 140 via the network 170. The indication of the low-quality signals together with the electronic listing may be stored by the database 146 of the server 140 or at least one of: the RAM 184, the MP 182 or the data storage 192 of the computer system 110. The method 400 may end, in some embodiments, with presenting the indication of the one or more low-quality signals together with the electronic listing to the user via the graphical user interface.

Figure 5:
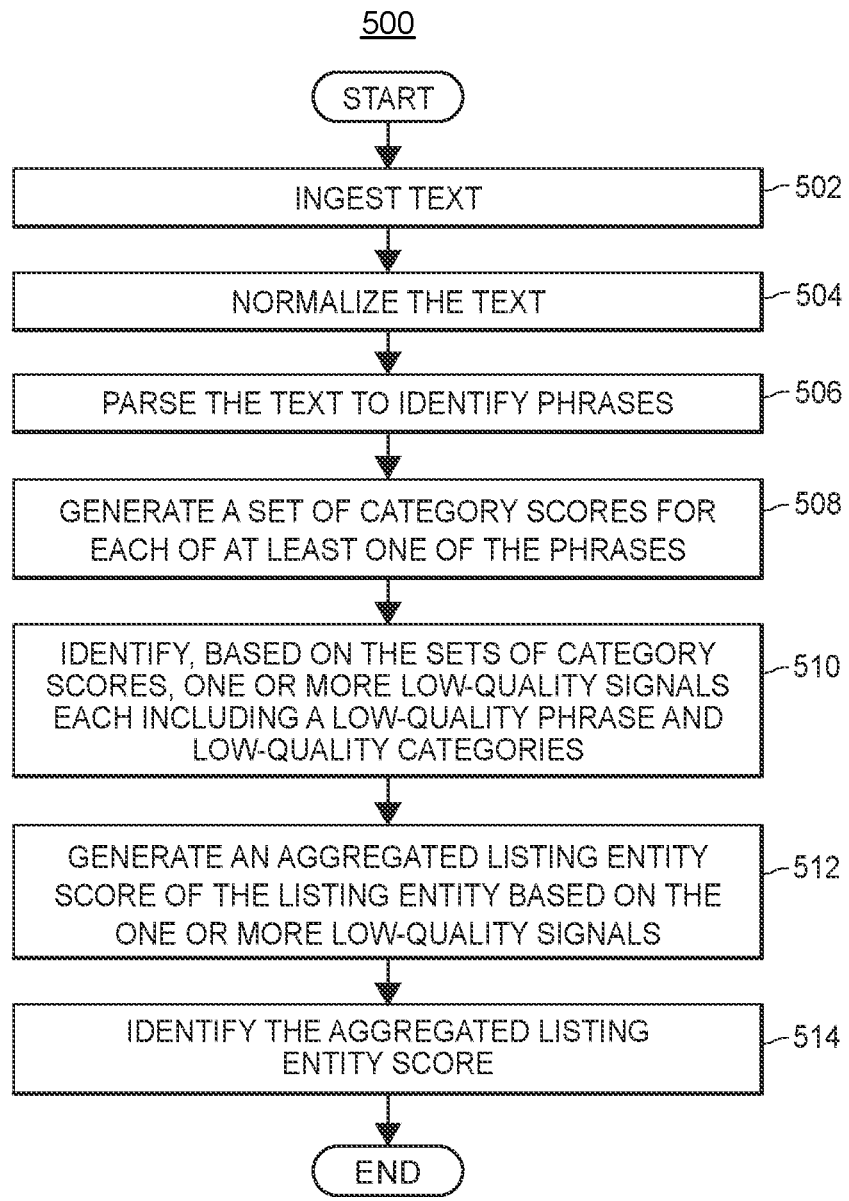
FIG. 5 illustrates a flow diagram of an exemplary method for identifying low-quality signals of an electronic listing of a listing entity and generating and indicating an aggregated listing entity score.

FIG. 5 illustrates a flow diagram of an exemplary method 500 for identifying low-quality signals of an electronic listing of a listing entity and generating and indicating an aggregated listing entity score. The method 500 includes ingesting text which includes (i) listing information of the electronic listing and (ii) listing entity information of the listing entity (block 502). The method 500 further includes normalizing the text which includes replacing first text of the text with second text from a list of predetermined text (block 504). The method 500 further includes parsing the text to identify a plurality of phrases included in the text (block 506). The method 500 further includes generating a respective set of category scores for each of at least one of the plurality of phrases by applying a scoring algorithm (block 508), wherein the respective set of category scores includes a plurality of scores for each of a plurality of low-quality categories. The method 500 further includes, identifying one or more low-quality signals which each include (i) a respective low-quality phrase that is a phrase that corresponds to at least one score of the respective set of low-quality category scores that satisfies a low-quality threshold, and (ii) at least one of the plurality of low-quality categories that corresponds to the at least one score that satisfies the low-quality threshold (block 510). The method 500 further includes generating an aggregated listing entity score of the listing entity based on the one or more low-quality signals (block 512). The method 500 further includes indicating the aggregated listing entity score (block 514). At least some of the method 500 may use the system 100 of FIG. 1 or may be the same as or similar to the process 300A or the process 300B.

Block 502, block 504, block 506, block 508, and block 510 may each be similar to or equivalent to each of block 402, block 404, block 406, block 408, and block 410, respectively. While not illustrated in FIG. 5, in some embodiments, a block that is similar to or equivalent to block 412 may be included in the method 500.

At block 512, an aggregated listing entity score for the listing entity based on the one or more low-quality signals may be generated. An aggregated listing entity score for the listing entity may be one or more scores which may aggregate sets of category scores for phrases across a plurality of electronic listings. In some embodiments, a time-decay weighted average may be used to aggregate the sets of category scores for the phrases across the plurality of electronic listings. In some embodiments, the aggregated listing entity score may include one or more subscores for each of one or more categories (e.g., the low-quality categories described herein), or the aggregated listing entity score may be a single score which may indicate how well the listing entity complies with honest selling practices (i.e., not deceptive practices). In some embodiments, if the aggregated listing entity score for an entity satisfies a threshold, the listing entity may be flagged (e.g., the listing entity may be flagged as a deceptive entity or as an honest entity). In some embodiments, there may be certain outcomes associated with the aggregated listing entity score for the entity. In one example, the aggregated listing entity score may modify one or more electronic listings of the listing entity, such as, modifying how electronic listings of the listing entity are presented (e.g., if the listing entity is flagged as being deceptive, their electronic listings may not be displayed as prominently in product searches as other electronic listings of more honest listing entities). In another example, if the listing entity is flagged as being honest, electronic listings corresponding to the listing entity may have modifications applied to include certain badges (e.g., "Trustworthy Seller," "Superstar Seller," etc.) in the electronic listings. In yet another example, listing entities that are flagged as being deceptive may have their electronic listings temporarily removed or be unable to add new electronic listings until the listing entity satisfies certain requirements (e.g., improve average rating, resolve outstanding buyer complaints, etc.). Generating the aggregated listing entity score may be performed by the server 140 or the computer system 110. Generating the aggregated listing entity score may have been initiated either automatically or in response to a request. The request may have originated from the computer system 110, for example, due to the user of the computer system 110 requesting an aggregated listing entity score to be generated (e.g., for a particular listing entity or for a batch of listing entities). The aggregated listing entity score may be stored by the database 146 of the server 140 or at least one of: the RAM 184, the MP 182 or the data storage 192 of the computer system 110.

At block 514, an indication of the aggregated listing entity score is presented to a user via a graphical user interface (e.g., a user interface of a client computing device 150). In some embodiments, presenting the indication of the aggregated listing entity score may including presenting the aggregated listing entity score together with one or more electronic listings or one or more listing entity reviews. In some embodiments, presenting the indication of the aggregated listing entity score may include presenting the aggregated listing entity score together with indications of one or more outcomes (e.g., modifications applied to electronic listings of the listing entity) associated with the aggregated listing entity score. The indication of the aggregated listing entity score may be presented either automatically or in response to a request, such as a request from a user to access an electronic listing. In embodiments where the server 140 generates the aggregated listing entity score, the client computing device 150 may receive the indication of the aggregated listing entity score from the server 140 via the network 170. The indication of the aggregated listing entity score may be stored by the database 146 of the server 140 or at least one of: the RAM 184, the MP 182 or the data storage 192 of the computer system 110. The method 500 may end, in some embodiments, with presenting the indication of the aggregated listing entity score to the user via the graphical user interface.

Figure 6:
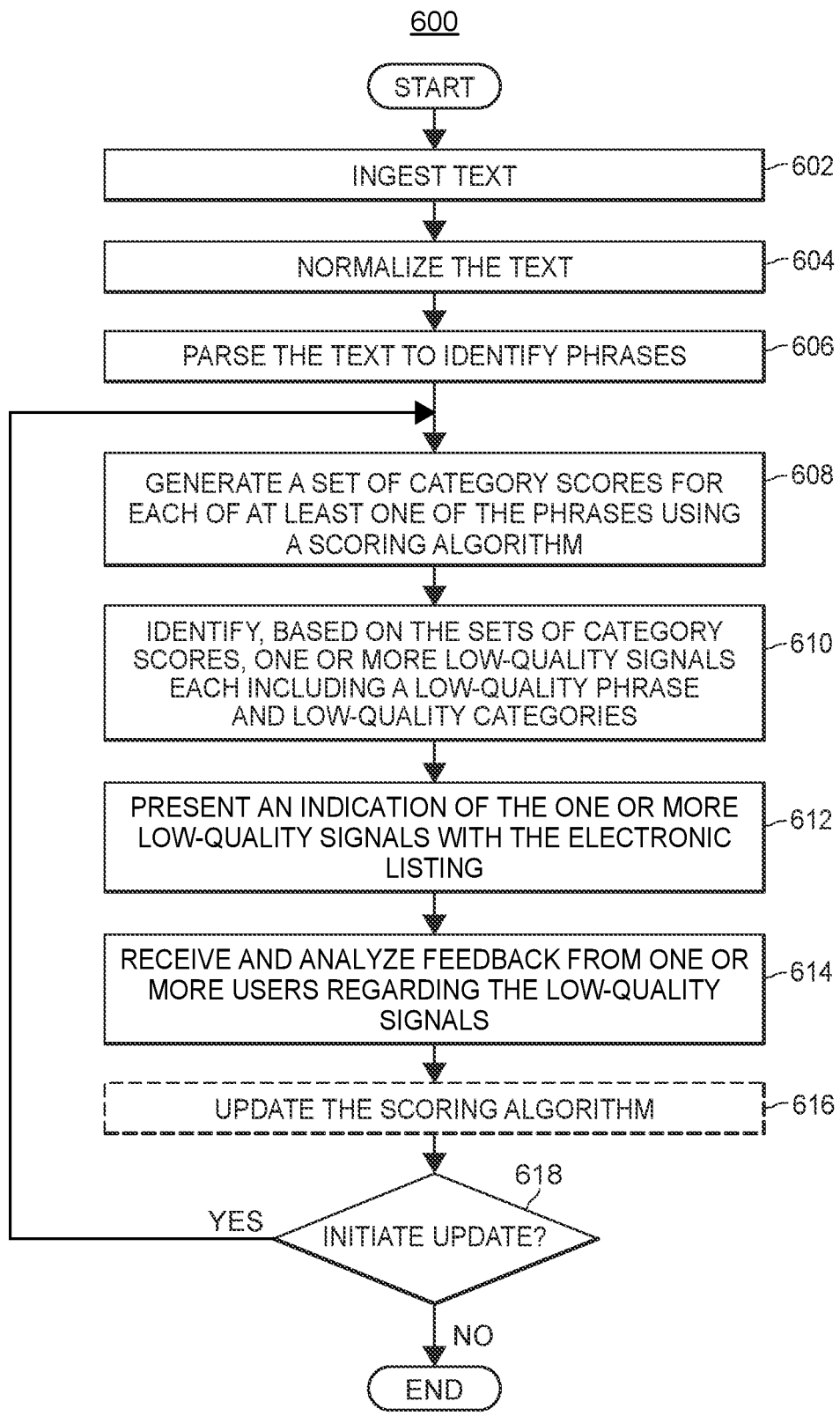
FIG. 6 illustrates a flow diagram of an exemplary method for identifying low-quality signals of an electronic listing of a listing entity and updating a scoring algorithm based on analysis of user feedback.

FIG. 6 illustrates a flow diagram of an exemplary method 600 for identifying low-quality signals of an electronic listing of a listing entity and updating a scoring algorithm based on analysis of user feedback. The method 600 includes ingesting text which includes (i) listing information of the electronic listing and (ii) listing entity information of the listing entity (block 602). The method 600 further includes normalizing the text, which includes replacing first text of the text with second text from a list of predetermined text (block 604). The method 600 further includes parsing the text to identify a plurality of phrases included in the text (block 606). The method 600 further includes generating a respective set of category scores for each of at least one of the plurality of phrases by applying a scoring algorithm (block 608), wherein the respective set of category scores includes a plurality of scores for each of a plurality of low-quality categories. The method 600 further includes, identifying one or more low-quality signals which each include (i) a respective low-quality phrase that corresponds to at least one score of the respective set of low-quality category scores that satisfies a low-quality threshold, and (ii) at least one of the plurality of low-quality categories that corresponds to the at least one score that satisfies the low-quality threshold (block 610). The method 600 further includes presenting an indication of the one or more low-quality signals together with the electronic listing to a user via a graphical user interface (block 612). The method 600 further includes receiving an analyzing feedback from a user regarding the low-quality signals to determine inferred value of the indication of the one or more low-quality signals (block 614). In some embodiments, the method 600 further includes updating the scoring algorithm based on the feedback from the user (block 616). At least some of the method 600 may use the system 100 of FIG. 1 or may be the same as or similar to the process 300A or the process 300B.

Block 602, block 604, block 606, block 608, block 610, and block 612 may each be similar to or equivalent to each of block 402, block 404, block 406, block 408, block 410, and block 412, respectively.

At block 614, feedback regarding the low-quality signals is received and analyzed. The feedback may be provided after presenting the indication of the one or more low-quality signals. In some embodiments, the feedback may be provided in response to a request for feedback. In some embodiments, the feedback may be provided without a request for feedback, such as by monitoring user interactions with the electronic listing. In some embodiments, the scoring algorithm may be validated using feedback. The feedback may be indicative of an inferred value of the low-quality signals. In some embodiments, the feedback may be user feedback. The user feedback may include asking a user if certain phrases are important to their purchase decision-making process or if they believe certain phrases may be deceptive. The user feedback may include behavior such as at least one of: cursor movement, clicking, highlighting or copying text, scrolling behavior, zooming behavior, or other behavior of the user on the electronic listing. The behavior may be used to determine whether the scoring algorithm is accurate in its scoring. Receiving and analyzing feedback regarding the key text may be performed by the server 140 or the computer system 110. The feedback (either with or without analysis of the feedback included) may be stored by the database 146 of the server 140 or at least one of: the RAM 184, the MP 182 or the data storage 192 of the computer system 110.

In some embodiments, at block 616, the scoring algorithm may be updated based on the feedback (while in other embodiments, after block 614, the method 600 may end). Updating the scoring algorithm may include, for example, changing parameter values or weights. When the scoring algorithm has been updated, the scoring algorithm may be stored for later use according to the methods and techniques disclosed herein. The scoring algorithms may be stored as sets of parameter values or weights for analysis of further user interaction data or user data, which may also include analysis logic or indications of model validity in some instances. In some embodiments, the updated scoring algorithm may be stored (either with the non-updated scoring algorithm, or replacing the non-updated scoring algorithm) by the database 146 of the server 140 or at least one of: the RAM 184, the MP 182 or the data storage 192 of the computer system 110.

After the scoring algorithm is updated based on the feedback, the method 600 may end. In other embodiments, it may be determined that an update to the set of category scores should be initiated (block 618). The determination that an update should initiate may, in some examples, be in response to a determination of changes to the scoring algorithm exceeding a threshold change level for one or more parameters. In further examples, an update may be determined based upon a time elapsed or amount of user feedback received since a previous update. Once it is determined an update should initiate at block 618, the method 600 may return to block 608 and generate an updated set of category scores for each of the at least one of the phrases using the updated scoring algorithm. The method 600 may then continue to block 610, block 612, block 614, and block 616. At block 614, new feedback may be received regarding updated indications of low-quality signals presented in block 612. Based on the new feedback, the scoring algorithm may be updated again at block 616 and may continue in a repetitive manner, returning to block 608, with initiating of additional new user sessions.

FIG. 7 illustrates a flow diagram of an exemplary method 700 for identifying low-quality signals of an electronic listing of a listing entity and generating and sending correspondence to the listing entity or applying a modification to the electronic listing. The method 700 includes ingesting text which includes (i) listing information of the electronic listing and (ii) listing entity information of the listing entity (block 702). The method 700 further includes normalizing the text which includes replacing a first portions of text from the ingested text with a corresponding second portion of text from a list of predetermined text (block 704). The method 700 further includes parsing the text to identify a plurality of phrases included in the text (block 706). The method 700 further includes generating a respective set of category scores for each of at least one of the plurality of phrases by applying a scoring algorithm (block 708), wherein the respective set of category scores includes a plurality of scores for each of a plurality of low-quality categories. The method 700 further includes identifying one or more low-quality signals, which each include (i) a respective low-quality phrase that corresponds to at least one score of the respective set of low-quality category scores that satisfies a low-quality threshold, and (ii) at least one of the plurality of low-quality categories that corresponds to the at least one score that satisfies the low-quality threshold (block 710). The method 700 further includes, in response to identifying the one or more low-quality signals, (i) generating and sending correspondence to the listing entity, or (ii) applying a modification to the electronic listing (block 614). At least some of the method 700 may use the system 100 of FIG. 1 or may be the same as or similar to the process 300A or the process 300B.

Block 702, block 704, block 706, block 708, and block 710 may each be similar to or equivalent to each of block 402, block 404, block 406, block 408, and block 410, respectively. While not illustrated in FIG. 7, in some embodiments, a block that is similar to or equivalent to block 412 may be included in the method 700.

At block 712, in response to identifying the one or more low-quality signals, (i) correspondence may be generated and sent to the listing entity, or (ii) a modification to the electronic listing may be applied. In some embodiments, the correspondence may include an indication of the electronic listing (e.g., an identification number for the electronic listing, a title/name of the electronic listing, etc.) or the low-quality signals. In some embodiments, the correspondence may include an indication that the listing entity has been flagged as having one or more electronic listings which are deceptive. In some embodiments, the correspondence may include an indication of an aggregated listing entity score for the listing entity. In some embodiments, the correspondence may include an indication of certain outcomes associated with the aggregated listing entity score or the low-quality signals, such as modifications applied to one or more electronic listings of the listing entity (e.g., if the listing entity is flagged as being deceptive, their electronic listings may be modified to not display as prominently in product searches as other electronic listings of more honest listing entities), if one or more electronic listings of the listing entity may be modified to include certain badges (e.g., "Trustworthy Seller," "Superstar Seller," "Seller Under Review," "Seller on Probation" etc.), if the listing entity may have their electronic listings temporarily removed or be unable to add new electronic listings until the listing entity satisfies certain requirements (e.g., improve average rating, resolve outstanding buyer complaints, etc.), etc. In some embodiments, the correspondence may solicit a response from the seller, such as, asking the listing entity for their interpretation/understanding of events included in a review or complaint directed at the listing entity (i.e., "the listing entity's side of the story"), asking the listing entity about certain remedies they are willing to agree to in order to settle an outstanding complaint or have certain applied modifications to one or more electronic listings of the entity reversed, etc. The correspondence may be generated or the modifications to one or more electronic listings may be applied either automatically (e.g., in response to one or more low-quality listing signals, in response to an aggregated listing entity score, in response to satisfying a threshold number of low-quality signals or a threshold aggregated listing entity score, etc.) or in response to a request. The correspondence may be sent using any suitable format (e.g., text messages, e-mail, push notifications, automated phone call, etc.) from the computer system 110 or server 140 via the network 170 to a computer system associated with a listing entity. The correspondence or indications of the applied modifications may be stored by the database 146 of the server 140 or at least one of: the RAM 184, the MP 182 or the data storage 192 of the computer system 110.

OTHER CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," "ingesting," "parsing," "normalizing," "identifying," "generating," "receiving," "applying," "updating," "indicating," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for systems and methods according to the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Although the foregoing text sets forth a detailed description of numerous different embodiments, it should be understood that the legal scope of the invention is defined by the words of the claims set forth at the end of this patent. The particular features, structures, or characteristics of any specific embodiment may be combined in any suitable manner and in any suitable combination with one or more other embodiments, including the use of selected features without corresponding use of other features. It is to be understood that other variations and modifications of the embodiments of the present invention described and illustrated herein are possible in light of the teachings herein and are to be considered part of the spirit and scope of the present invention. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for the sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

What is claimed is:

1. A computer-implemented method for identifying low-quality signals of an electronic listing of a listing entity, comprising:
ingesting, by one or more processors, text including (i) listing information of the electronic listing and (ii) listing entity information of the listing entity;

normalizing, by the one or more processors, the text by replacing first text of the text with second text from a list of predetermined text;

parsing, by the one or more processors, the text to identify a plurality of phrases included in the text;

generating, by the one or more processors, a respective set of category scores for each of at least one of the plurality of phrases by applying a scoring algorithm, wherein the respective set of category scores includes a plurality of scores for each of a plurality of low-quality categories;

identifying, by the one or more processors, one or more low-quality signals which each include:

(i) a respective low-quality phrase that is a phrase, of the at least one of the plurality of phrases, that corresponds to at least one score, of the respective set of low-quality category scores, that satisfies a low-quality threshold, and (ii) at least one of the plurality of low-quality categories that corresponds to the at least one score that satisfies the low-quality threshold; and presenting, by the one or more processors, an indication of the one or more low-quality signals together with the electronic listing to a user via a graphical user interface.

2. The method of claim 1, further comprising:

generating, by the one or more processors, an aggregated listing entity score of the listing entity based on the one or more low-quality signals; and indicating, by the one or more processors, the aggregated listing entity score.

3. The method of claim 1, further comprising:

receiving, at the one or more processors, feedback from a user following presenting the indication of the one or more low-quality signals, the feedback regarding the low-quality signals and including user input;

analyzing, by the one or more processors, the feedback from the user to determine an inferred value of the indication of the one or more low-quality signals; and updating, by the one or more processors, the scoring algorithm based on the feedback from the user.

4. The method of claim 1, further comprising:

receiving, by the one or more processors, a training data set comprising a plurality of electronic listings; and generating, by the one or more processors, the scoring algorithm by training a machine learning model using the training data set.

5. The method of claim 1, wherein at least one of: (i) the first text includes an acronym and the second text does not include the acronym, or (ii) the first text includes a contraction and the second text does not include the contraction.

6. The method of claim 1, wherein the low-quality categories are related to one or more of: deceptive pricing, deceptive condition, or deceptive inventory.

7. The method of claim 1, further comprising:

in response to identifying the one or more low-quality signals, at least one of:

(i) generating and sending, by the one or more processors, correspondence regarding the one or more low-quality signals to the listing entity, or (ii) applying, by the one or more processors, a modification to the electronic listing.

8. A computer system for identifying low-quality signals of an electronic listing of a listing entity, comprising:

one or more processors;

a program memory coupled to the one or more processors and storing executable instructions that, when executed by the one or more processors, cause the computer system to:

ingest text including: (i) listing information of the electronic listing, and (ii) listing entity information of the listing entity;

normalize the text by replacing first text of the text with second text from a list of predetermined text;

parse the text to identify a plurality of phrases included in the text;

generate a respective set of category scores for each of at least one of the plurality of phrases by applying a scoring algorithm, wherein the respective set of category scores includes a plurality of scores for each of a plurality of low-quality categories;

identify one or more low-quality signals which each include:

(i) a respective low-quality phrase that is a phrase, of the at least one of the plurality of phrases, that corresponds to at least one score, of the respective set of low-quality category scores, that satisfies a low-quality threshold, and (ii) at least one of the plurality of low-quality categories that corresponds to the at least one score that satisfies the low-quality threshold; and present an indication of the one or more low-quality signals together with the electronic listing to a user via a graphical user interface.

9. The computer system of claim 8, wherein the executable instructions further cause the computer system to:

generate an aggregated listing entity score of the listing entity based on the one or more low-quality signals; and indicate the aggregated listing entity score.

10. The computer system of claim 8, wherein the executable instructions further cause the computer system to:

receive feedback from a user following presenting the indication of the one or more low-quality signals, the feedback regarding the low-quality signals and including user input;

analyze the feedback from the user to determine inferred value of the indication of the one or more low-quality signals; and update the scoring algorithm based on the feedback from the user.

11. The computer system of claim 8, wherein the executable instructions further cause the computer system to:

receive a training data set comprising a plurality of electronic listings; and generate the scoring algorithm by training a machine learning model using the training data set.

12. The computer system of claim 8, wherein at least one of: (i) the first text includes an acronym and the second text does not include the acronym, or (ii) the first text includes a contraction and the second text does not include the contraction.

13. The computer system of claim 8, wherein the low-quality categories are related to one or more of: deceptive pricing, deceptive condition, or deceptive inventory.

14. The computer system of claim 8, wherein the executable instructions further cause the computer system to:

in response to identifying the one or more low-quality signals, at least one of:

(i) generating and sending, by the one or more processors, correspondence regarding the one or more low-quality signals to the listing entity, or (ii) applying, by the one or more processors, a modification to the electronic listing.

15. The computer system of claim 8, wherein the executable instructions further cause the computer system to:
receive a training data set comprising a plurality of electronic listings; and
generate the scoring algorithm by training a machine learning model using the training data set.

16. A tangible, non-transitory computer-readable medium storing executable instructions for identifying low-quality signals of an electronic listing of a listing entity that, when executed by one or more processors of a computer system, cause the computer system to:
ingest text including one or more of: (i) listing information of the electronic listing, or (ii) listing entity information of the listing entity;
normalize the text by replacing first text of the text with second text from a list of predetermined text;
parse the text to identify a plurality of phrases included in the text;
generate a respective set of category scores for each of at least one of the plurality of phrases by applying a scoring algorithm, wherein the respective set of category scores includes a plurality of scores for each of a plurality of low-quality categories;
identify one or more low-quality signals which each include:
(i) a respective low-quality phrase that is a phrase, of the at least one of the plurality of phrases, that corresponds to at least one score, of the respective set of low-quality category scores, that satisfies a low-quality threshold, and
(ii) at least one of the plurality of low-quality categories that corresponds to the at least one score that satisfies the low-quality threshold; and
present an indication of the one or more low-quality signals together with the electronic listing to a user via a graphical user interface.

17. The tangible, non-transitory computer-readable medium of claim 16, wherein:
the executable instructions further cause the computer system to:
generate an aggregated listing entity score of the listing entity based on the one or more low-quality signals; and
indicate the aggregated listing entity score.

18. The tangible, non-transitory computer-readable medium of claim 16, wherein:
the executable instructions further cause the computer system to:
receive feedback from a user following presenting the indication of the one or more low-quality signals, the feedback regarding the low-quality signals and including user input;
analyze the feedback from the user to determine inferred value of the indication of the one or more low-quality signals; and
update the scoring algorithm based on the feedback from the user.

19. The tangible, non-transitory computer-readable medium of claim 16, wherein:
the executable instructions further cause the computer system to:
receive a training data set comprising a plurality of electronic listings; and
generate the scoring algorithm by training a machine learning model using the training data set.

20. The tangible, non-transitory computer-readable medium of claim 16, wherein:
the executable instructions further cause the computer system to:
in response to identifying the one or more low-quality signals, at least one of:
(i) generating and sending, by the one or more processors, correspondence regarding the one or more low-quality signals to the listing entity, or
(ii) applying, by the one or more processors, a modification to the electronic listing.

* * * * *